Jan. 26, 1932.   V. Z. DE FERRANTI   1,842,716
HIGH VOLTAGE RECTIFICATION
Filed Sept. 11, 1929   3 Sheets-Sheet 1
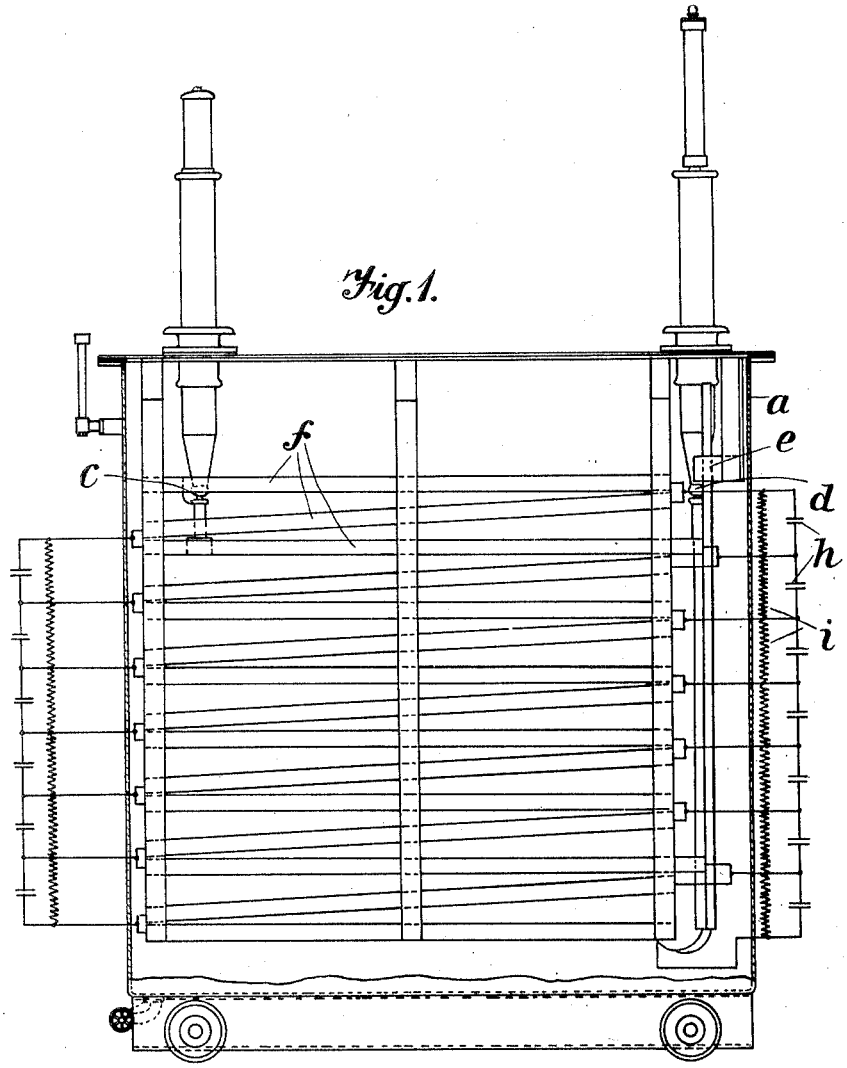

Jan. 26, 1932.   V. Z. DE FERRANTI   1,842,716
HIGH VOLTAGE RECTIFICATION
Filed Sept. 11, 1929   3 Sheets-Sheet 2
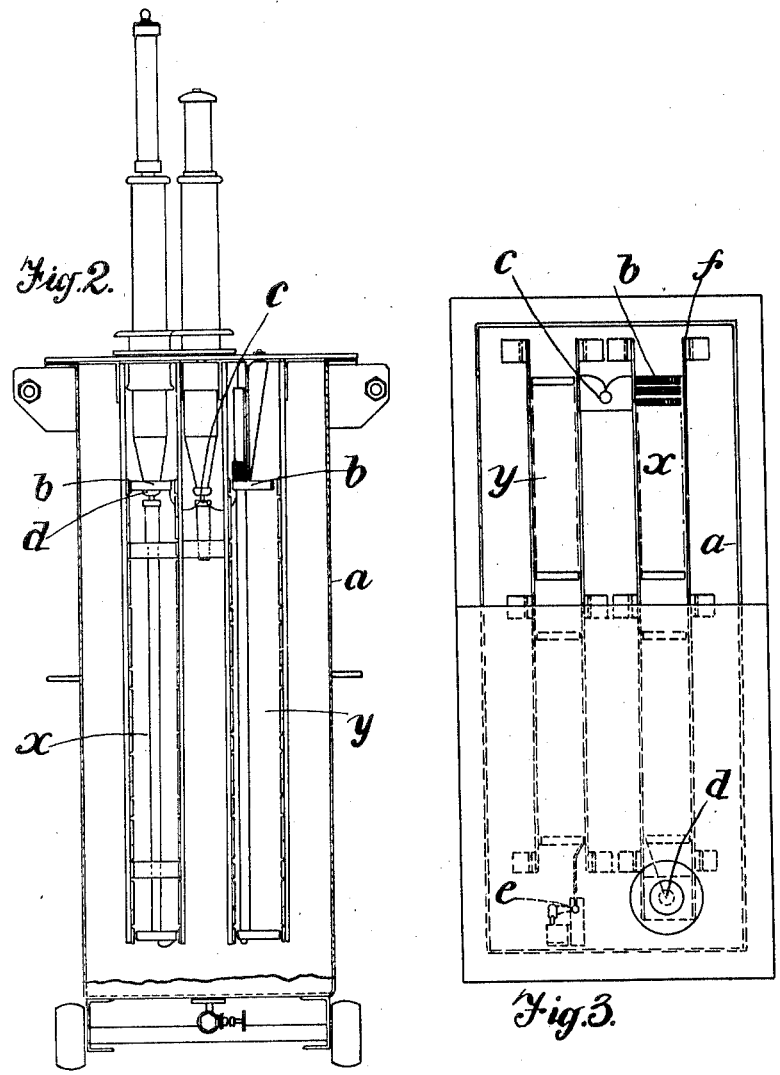
V. Z. De Ferranti
INVENTOR

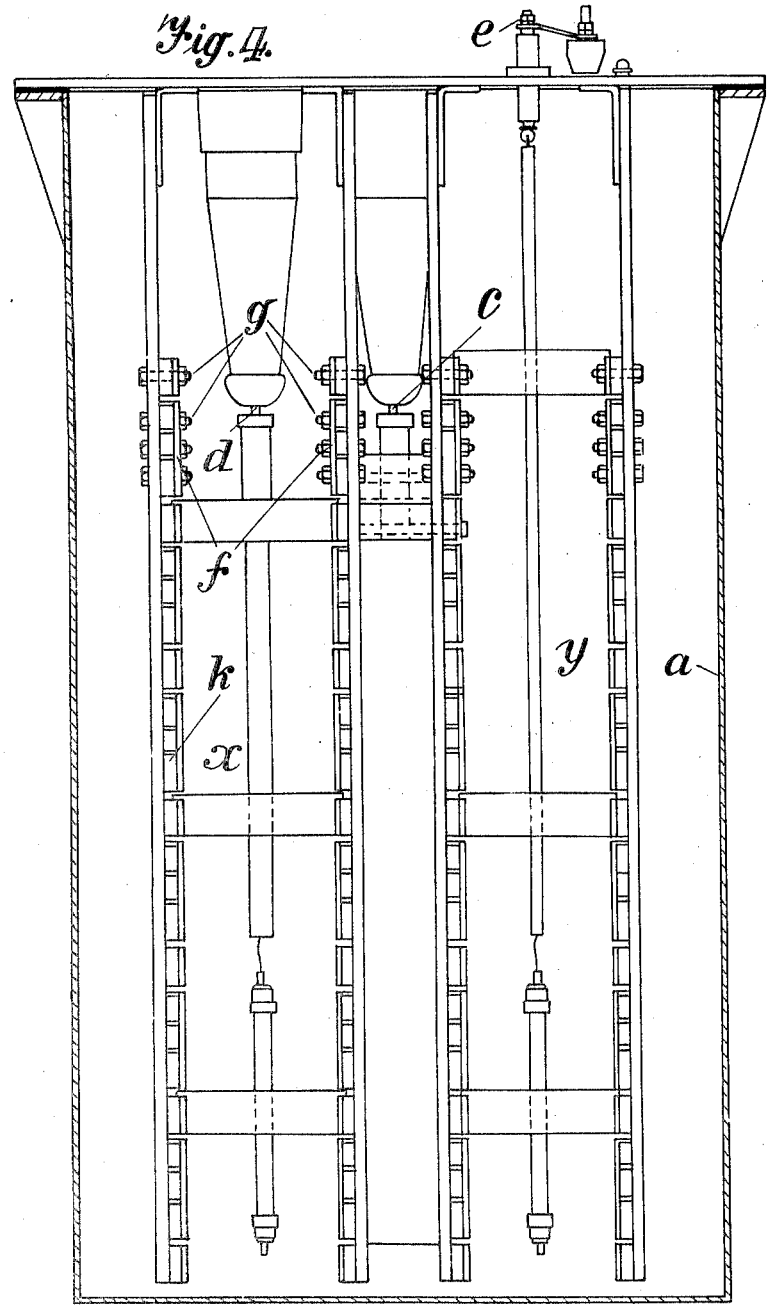

Patented Jan. 26, 1932

1,842,716

UNITED STATES PATENT OFFICE

VINCENT ZIANI DE FERRANTI, OF HOLLINWOOD, ENGLAND, ASSIGNOR TO FERRANTI INC., OF NEW YORK, N. Y.

HIGH VOLTAGE RECTIFICATION

Application filed September 11, 1929, Serial No. 391,903, and in Great Britain October 12, 1928.

This invention relates to high voltage rectification.

In usual current practice when rectified high voltage of the order of, say, 60,000 volts is required, say, for the purpose of dust and mist precipitation, synchronized mechanical rectifier mechanism is employed embodying a synchronous motor and rotary current collectors.

Such arrangements are simple, comparatively inexpensive and reliable but they involve certain drawbacks, e. g., (1) They cause great interference with radio reception over a wide area which is enhanced by the fact that the plant is usually running continuously;

(2) They involve moving parts which require protection from dust, &c., and require periodical attention and replacements;

(3) They give a very low overall efficiency, usually only about 12 to 15 per cent.

The thermionic valve provides an alternative rectifying device which removes the first two drawbacks but again the efficiency is only increased to about 20 to 30 per cent. and a more serious danger is introduced, viz, the possibility of sudden complete failure which may involve destruction of large quantities of valuable products. Furthermore average life of such valves is strictly limited and the cost of replacement a serious item.

The present invention has for its object to enable rectifying plant to be constructed having good efficiency (of the order of at least, say, 60 to 80 per cent.) and at the same time being free from all the above drawbacks.

The invention consists in a high voltage rectifying bank of static rectifier elements of the copper oxide type immersed in air, oil or other suitable insulating material.

The invention also consists in a high voltage rectifying plant as set forth above wherein the elements are disposed in rows or racks arranged in zigzag fashion either in tiers or horizontal rows.

The invention also consists in a high voltage rectifying plant as set forth above wherein a network of oil-immersed rectifying banks is provided in bridge form, the pairs of banks which are connected to the A. C. input terminals preferably being disposed in common oil-containing casings and either the positive or negative D. C. terminal being earthed or both being insulated from earth.

The invention also consists in a high voltage rectifying plant as set forth above wherein a network of oil-immersed rectifying banks is provided together with suitable stabilizing condensers, so that the transformer voltage is doubled and the ripple in the D. C. voltage is equivalent to that provided by full wave rectification, the positive or negative D. C. terminal being earthed or both insulated as required and the pair of banks being preferably disposed in a common oil-containing casing.

The invention also consists in a high voltage rectifying plant as set forth above wherein a network of oil-immersed rectifying banks is provided arranged to give full wave rectification, the positive or negative D. C. terminal being earthed or both insulated as required and the pair of rectifier banks preferably being disposed in separate oil-containing casings.

The invention also consists in a high voltage rectifying plant as set forth above wherein a network of oil-immersed rectifying banks is provided arranged to provide half wave rectification, either the positive or negative D. C. terminal being earthed or both insulated as required.

The invention also consists in a high voltage rectifying plant substantially as hereinafter described with reference to the accompanying drawings.

Referring to the accompanying diagrammatic drawings—

Figure 1 is a side view with part of the exterior casing removed of a convenient construction in accordance with the present invention.

Figure 2 is an end view thereof (with part removed).

Figure 3 is a plan view with the left-hand half of the top casing removed, and

Figure 4 is an enlarged end view showing details of construction.

In carrying the invention into effect in one convenient form illustrated by way of example in Figures 1 to 3 as applied to a rectifier plant arranged with rectifier units in four arms, that is in bridge fashion, I provide two oil-containing casings each containing two rectifier units disposed side by side and completely oil immersed. Each unit comprises a large number of elements of the copper oxide type. These elements are built up into short piles which are disposed laterally in relation to the casings. One casing is indicated at $a$ containing piles $b$ of elements, the piles being laid in rows vertically one above another extending from near the top to near the bottom of one side of the casing. The piles are supported but insulated from members $f$ which are disposed at an angle to the horizontal so as to present a zigzag formation when viewed in side elevation (Figure 1).

The individual piles are all connected together in series from terminal $d$ to terminal $e$, the connections being zigzagged in plan view (Figure 3). Each unit $x$ and $y$ is similarly formed, the two units being connected together with rectification in the same direction in the two units.

The mounting of the horizontal rows or tiers onto the vertical supports is so arranged by spacing blocks $k$ that any horizontal row of rectifying elements can be removed from the bank without disturbing in any way the adjacent rows or tiers.

The junction point $c$ between the two units $x$ and $y$ in the casing $a$ constitutes the terminals for connection to the A. C. source. The free ends $d$ and $e$ of the units $x$ and $y$ are joined together in pairs and constitute the connection points from which the D. C. output is obtained, one of these points $e$ preferably being earthed by way of the casing as shown. The connection of the free ends is such that the direction of rectification in each pair of units is towards the junction (e. g. towards $d$) in the case $a$ and away from the joint e. g. $e$) in a second case (not shown).

The arrangement is such that there is a substantially even potential gradient from one end to the other of each unit.

In order to maintain equal distribution of voltage throughout the rectifier elements connected in one unit during the non-rectifying half of the voltage wave, equalizing capacities $h$ and/or resistances $i$ are connected between those ends of the horizontal rows which are not connected together (Figure 1).

In order to facilitate dismantling in case of a breakdown of one or more elements, or for any other reason, a horizontal row of rectifier elements can be removed by simply raising the rectifiers out of the oil and removing the bolts $g$ which attach any particular row to the vertical supports.

It will be appreciated that in accordance with the present invention rectifier apparatus of very great reliability, which incidentally yields an efficiency of between about 60 and 80 per cent., is obtained, and, furthermore, no disturbance to radio reception occurs and there are no moving parts or parts requiring special protection from dust and dirt (the whole apparatus is entirely enclosed).

If, in any of the above arrangements, the current output required exceeds that of a single rectifier element or bank, a further bank or banks may be connected in parallel with equalizing resistances. The extra banks so needed may be housed in the same casing or other casing may be used.

I claim:

1. A high voltage rectifier comprising a plurality of sections disposed in zigzag fashion and immersed in a suitable insulating material, each section embodying a plurality of elements of the copper oxide type electrically connected in zigzag fashion.

2. A high voltage rectifier as claimed in claim 1 wherein the elements constituting said sections are arranged in parallel rows and are connected electrically in zigzag fashion.

3. A high voltage rectifying plant as claimed in claim 1 wherein a network of oil-immersed rectifying banks is provided in bridge form, each pair of banks which are connected to the same A. C. input terminal being disposed in a common oil-containing casing.

4. A high voltage rectifying plant including a plurality of static rectifier units of the copper oxide type arranged in sections forming a zigzag and connected electrically in series and a plurality of equalizing condensers connected respectively across adjacent pairs of junctions between the sections of said zigzag.

5. A high voltage rectifying plant including a plurality of static rectifier units of the copper oxide type arranged in sections forming a zigzag and connected electrically in series and a plurality of resistances connected respectively across adjacent pairs of junctions between the sections of said zigzag.

6. A high voltage rectifier embodying a supporting frame, a plurality of rectifier element supporting sections disposed in zigzag fashion, a plurality of distance pieces between said sections and said supporting frame and clamping means between said frame and said sections, whereby individual sections may readily be removed without disturbing adjacent sections.

In testimony whereof I have signed my name to this specification.

VINCENT ZIANI DE FERRANTI.